Patented Apr. 8, 1941

2,237,325

UNITED STATES PATENT OFFICE 2,237,325

ACETONE-FORMALDEHYDE RESINS

Emil H. Balz, Toledo, Ohio, assignor to Plaskon Company, Incorporated, Toledo, Ohio, a corporation of Delaware No Drawing. Application July 27, 1938, Serial No. 221,608

7 Claims. (Cl. 260—64)

The invention relates to synthetic resins, and in particular those formed by the reaction of acetone with formaldehyde or its polymers.

The thermosetting reaction products of acetone and formaldehyde that have been prepared heretofore were unsatisfactory because of the fact that formaldehyde was given off during the setting of the products. Alkalis were used as catalysts to cause the products to set; but the formaldehyde that was given off during the setting reacted with the alkali. The reaction of the alkali with the evolved formaldehyde resulted in the neutralization of the alkali, which seriously interfered with the setting of the products. Moreover, the evolution of gas during the setting of the products produced bubbles and other serious gas flaws. It has been considered impossible heretofore to avoid the serious difficulties arising from the evolution of formaldehyde during the setting of acetone-formaldehyde reaction products.

The principal object of the invention is the preparation of products from a thermosetting acetone-formaldehyde compound without the evolution of gas. More specific objects and advantages are apparent from the description, which merely discloses and illustrates the invention and is not intended to impose limitations upon the claims.

A liquid embodying the invention that comprises the product of a reaction of acetone with formaldehyde in a ratio from about 1:4 to about 1:2, which product is capable of setting without evolution of gas, has the peculiarity that it only shows up to about 3½ per cent formaldehyde by the sulfite test. (The sulfite test is a method of analysis that consists in neutralizing the liquid to be analyzed for formaldehyde, adding a neutral sulfite, and titrating with a standard acid solution to determine the amount of free alkali liberated.) Formaldehyde that is detected by the sulfite test is not necessarily free formaldehyde, but may be formaldehyde that is relatively loosely bound.

In accordance with the invention, a product capable of setting without evolution of gas can be prepared by reacting acetone slowly with a substance selected from the group consisting of formaldehyde and polymers thereof, evaporating the resulting liquid, and then carrying the slow reaction further. These three steps are believed to constitute the first reproducible method of preparing an acetone-formaldehyde reaction product that is capable of setting without evolution of gas.

An alkali is customarily used as a catalyst to cause acetone to react with formaldehyde. If the reaction is allowed to proceed too rapidly, a colored product is produced that is permanently soluble and thermoplastic. A colorless thermosetting product can be formed by carrying the reaction on slowly. However, all the thermosetting reaction products of acetone and formaldehyde that have been prepared heretofore have been found to give off formaldehyde upon setting.

The present method consists basically in carrying out the reaction of acetone and formaldehyde in a molar ratio from about 1:4 to about 1:2 slowly enough to produce a thermosetting product, but carrying it far enough to produce a liquid that only shows up to about 3½ per cent formaldehyde by the sulfite test. When acetone and formaldehyde are brought together in the presence of alkali, a condensation reaction occurs and water is split off. This reaction apparently does not proceed far enough to produce a product that sets without evolution of gas. The present invention is based upon the discovery that if the water of condensation is evaporated after completion of the initial reaction, a further reaction can be carried out to produce a reaction product that sets without evolution of gas. The further reaction that is carried out after the evaporation produces an important change in the product. This further reaction results in the formation of a product that can be set much more easily than prior acetone-formaldehyde reaction products because it gives off no formaldehyde to neutralize the alkali catalyst. Since a reaction product prepared in accordance with the invention does not give off formaldehyde as it sets, less alkali needs to be present at the beginning of the setting of the product. Because of the destructive action of strong alkali upon cellulose, the necessity for adding a large amount of alkali in order to cause the setting of prior reaction products to proceed to completion was highly disadvantageous when it was desired to impregnate paper or a cellulosic filler with the products.

Various properties of liquids prepared in accordance with the invention that only show up to about 3½ per cent formaldehyde by the sulfite test indicate that the acetone-formaldehyde compound in such liquids is distinctly different from the acetone-formaldehyde reaction products in prior liquids. The further reaction that is carried out after the evaporation step may consist not only of the splitting off of formaldehyde, but also of the rearranging of the molecules of the acetone-formaldehyde compound. During the preparation of one liquid in accordance with the invention, a sample of the syrup was removed immediately after the evaporation step, and the remainder of the syrup was subjected to further reaction to produce a liquid that showed less than 3½ per cent formaldehyde by the sulfite test. When sodium bisulfate and formaldehyde were added to the sample that had been removed, heating caused the sample to solidify, but further heating caused the sample to become liquid again. In contrast, the addition of sodium bisulfate and formaldehyde to the liquid that showed less than 3½ per cent formaldehyde by the sulfite test, followed by heating, caused the liquid to solidify permanently, so that the solidified mass could not be liquefied by further application of heat.

In the first step of the preferred method of preparing a thermosetting liquid embodying the invention, an aqueous solution containing from about ½ to about ¼ mol of acetone and from about 1/20 to about 1/60 equivalent of strong alkali for each mol of formaldehyde is held at room temperatures for about 24 hours. Strong alkalis that may be employed are potassium hydroxide, potassium carbonate, sodium hydroxide, and sodium carbonate. It should be noted that an equivalent of potassium hydroxide is equal to 1 mol, whereas an equivalent of sodium or potassium carbonate is equal to ½ mol. If too much alkali is used, the reaction may get out of control. The use of too little alkali must also be avoided, because the alkalinity of the solution, which gradually decreases, must be great enough so that the reaction is not permanently arrested.

The second step of the preferred method consists in evaporating the resulting alkaline liquid at temperatures up to about 60° C. The alkalinity of the liquid during the evaporation causes a decrease in its content of available formaldehyde, as shown by the sulfite test. After the completion of the evaporation, the resulting viscous liquid is transparent and colorless. It does not smell of formaldehyde, although it shows considerable available formaldehyde by the sulfite test. This available formaldehyde is believed to be loosely bound, not free formaldehyde.

In the third step of the preferred method, the liquid that is obtained upon evaporation is kept at temperatures up to about 60° C. until the liquid only shows up to about 3½ per cent of formaldehyde by the sulfite test. It may be necessary to employ additional alkali in the third step. The length of time required for the completion of the step depends upon the temperature and alkalinity of the liquid. If a relatively large amount of alkali is employed, the third step takes only a few hours at 0° C.

If desired, the final syrup resulting from the third step may be vacuum-dried. The dried product may then be used in lacquers or other compositions. The syrup produced by the third step may also be diluted with water or other solvents, and used as a binder in the production of impregnated or laminated products, as an adhesive, as a dressing or creaseproofing agent for textiles, or as a coating or paper-sizing composition. It may also be used to impregnate cellulose material which is then ground to produce a molding powder. The syrup without dilution may be cast in molds to form transparent articles. It may be necessary to add further alkali to a reaction product prepared in accordance with the invention in order to render it thermosetting.

Setting of a liquid prepared in accordance with the invention proceeds as soon as the liquid has been made sufficiently alkaline, the setting of the more alkaline liquids at room temperatures being more rapid. Elevated temperatures up to about 150° C. can be used for rapid conversion of a thermosetting composition prepared in accordance with the invention to an infusible product, if desired.

Example 1

A solution of 3 parts of potassium carbonate in 30 parts of cold water is added to 90 parts of a cold 37 per cent aqueous solution of formaldehyde. (The quantity of potassium carbonate may vary from 2 to 4 parts, and 1 to 3 parts of potassium hydroxide may be used instead of the potassium carbonate if desired. When potassium or sodium hydroxide is employed, the subsequent reaction should be carried out at temperatures somewhat lower than those given in the present example.) The resulting solution is then added to 27 parts of acetone, and the ingredients are held at 25° C. for 36 hours.

The solution is then evaporated under a high vacuum at temperatures up to about 60° C. until no more water can be removed. After the evaporated solution has been analyzed by the sulfite test, $\frac{1}{12}$ equivalent of potassium carbonate is added for each equivalent of available formaldehyde found in the test. (In one experiment carried out in accordance with the example, the evaporation produced 69 parts of a solution that showed 8 per cent of formaldehyde by the sulfite test, so that it was necessary to add 2.1 parts of potassium carbonate.) Preferably the potassium carbonate is added in the form of a saturated aqueous solution. The alkaline liquid is then held at 50° C. for 8 hours, after which its formaldehyde content shown by the sulfite test is below 3½ per cent. The liquid then contains a thermosetting reaction product which sets without evolution of gas.

If a 5-gram sample of the liquid requires less than 1/10 c. c. of normal hydrochloric acid to render the sample neutral to phenolphthalein, the addition of further alkali is required to produce setting. The alkalinity to which the liquid is adjusted before setting determines the properties of the final product, such as flexibility.

Tabulated below are the properties of the set resin corresponding to varying alkalinity of the liquid, as determined by the number of c. c. of normal hydrochloric acid required to neutralize 5 grams of the liquid to phenolphthalein.

|  | Cubic centimeters |
|---|---|
| Transparent flexible | .1 to .3 |
| Opaque flexible | .3 to .6 |
| Hard solid opaque | 1 to 3 |

Although the amount of alkali required may be determined by titration of a sample of the liquid immediately after the period of 8 hours at 50° C., the final addition of alkali should not be made until setting is desired. Thus the liquid may be dehydrated or taken up in various solvents before the alkali is added, and the final alkaline thermosetting product may be utilized in any desired manner.

Example 2

A solution of 6 parts of potassium carbonate in 60 parts of cold water is added to 180 parts of a cold 37 per cent aqueous solution of formaldehyde. The resulting solution is then added to 27 parts of acetone, and the ingredients are held at 25° C. for 48 hours.

The solution is then evaporated under a high vacuum at temperatures up to about 60° C. until no more water can be removed. After the evaporated solution has been analyzed by the sulfite test, 1/12 equivalent of potassium carbonate is added for each equivalent of available formaldehyde found in the test. (In one experiment carried out in accordance with the example, the evaporation produced a solution that showed 12 per cent of formaldehyde by the sulfite test.) The alkaline liquid is then held at 60° C. for 8 hours, after which its formaldehyde content shown by the sulfite test is below 3 per cent. The amount of additional alkali that is necessary may be determined as in Example 1, and the thermosetting product may be utilized in any desired manner.

Various embodiments of the invention may be devised to meet various requirements.

Having described my invention, I claim:

1. A method of preparing a product capable of setting without evolution of gas that comprises maintaining an aqueous solution containing from about one-half to about one-fourth mol of acetone and from about one-twentieth to about one-fiftieth equivalent of strong alkali for each mol of formaldehyde at room temperatures for about 24 hours, vacuum evaporating the resulting alkaline liquid at temperatures up to about 60° C., and then slowly carrying the reaction further at temperatures up to about 60° C. in the presence of alkali for a period of time as great as that required to reduce the percentage of formaldehyde shown by the sulfite test; about three and one-half per cent when the acetone, alkali and formaldehyde are the sole reactants in the solution.

2. In a method of preparing a reaction product that comprises reacting acetone in the presence of an alkali with formaldehyde in a molar ratio from about 1:4 to about 1:2 and removing the water formed by the reaction, the temperature and alkalinity during the reaction being low enough to produce a thermosetting product, the step of continuing the reaction of the acetone and formaldehyde in the presence of an alkali for a period of time as great as that required to reduce the percentage of formaldehyde shown by the sulfite test to about three and one-half per cent when the acetone, alkali and formaldehyde are the sole reactants in the solution, to produce a product capable of setting without evolution of gas.

3. A method of preparing a product capable of setting without evolution of gas that comprises reacting acetone in the presence of an alkali with a substance selected from the group consisting of formaldehyde and polymers thereof in a molar acetone-formaldehyde ratio from about 1:4 to about 1:2 and removing the water formed by the reaction, the temperature and alkalinity during the reaction being low enough to produce a thermosetting product, and the reaction of the acetone and formaldehyde in the presence of an alkali being continued for a period of time as great as that required to reduce the percentage of formaldehyde shown by the sulfite test to about 3½ per cent when the acetone, alkali and formaldehyde are the sole reactants in the solution.

4. A method of preparing a product capable of setting without evolution of gas that comprises reacting acetone in the presence of an alkali with a substance selected from the group consisting of formaldehyde and polymers thereof in a molar acetone-formaldehyde ratio from about 1:4 to about 1:2, evaporating the resulting liquid, and then carrying the reaction further in the presence of an alkali, the temperature and alkalinity during the reaction being low enough to produce a thermosetting product, and said further reaction being continued for a period of time as great as that required to reduce the percentage of formaldehyde shown by the sulfite test to about 3½ per cent when the acetone, alkali and formaldehyde are the sole reactants in the solution.

5. A method of preparing a product capable of setting without evolution of gas that comprises reacting acetone with an alkaline aqueous formaldehyde solution in a molar ratio from about 1:4 to about 1:2, evaporating the resulting alkaline liquid under vacuum, and then carrying the reaction of the acetone and formaldehyde further in the presence of alkali, the temperature and alkalinity during the reaction being low enough to produce a thermosetting product, and said further reaction being continued for a period of time as great as that required to reduce the percentage of formaldehyde shown by the sulfite test to about 3½ per cent when the acetone, alkali and formaldehyde are the sole reactants in the solution.

6. A product capable of setting without evolution of gas prepared in accordance with the method of claim 3.

7. A set product free from gas flaws prepared from materials that include a thermosetting product prepared in accordance with the method of claim 3.

EMIL H. BALZ.